United States Patent [19]

Konrad

[11] Patent Number: 4,899,062
[45] Date of Patent: Feb. 6, 1990

[54] PROCESS AND APPARATUS FOR THE GENERATION OF TRANSMISSION CURRENT SIGNALS IN AN ALTERNATING CURRENT DISTRIBUTION NETWORK

[75] Inventor: Bernhard Konrad, Wetzikon, Switzerland

[73] Assignee: Zellweger Uster AG, Uster, Switzerland

[21] Appl. No.: 130,196

[22] Filed: Dec. 8, 1987

[30] Foreign Application Priority Data

Dec. 9, 1986 [CH] Switzerland .................. 04893/86

[51] Int. Cl.[4] .................. H02J 3/02; H04M 11/04
[52] U.S. Cl. .................. 307/3; 307/1; 340/310 R
[58] Field of Search .................. 307/1–8; 340/310 R, 870.18, 870.19, 310 A

[56] References Cited

U.S. PATENT DOCUMENTS 4,371,867 2/1983 Gander .................. 340/310 R
4,642,637 2/1987 Baer .................. 340/310 R X
4,794,509 12/1988 Nussbaumer .................. 363/141

FOREIGN PATENT DOCUMENTS 1142975 2/1969 United Kingdom .................. 340/310 R Primary Examiner—William M. Shoop, Jr.
Assistant Examiner—Sharon D. Logan
Attorney, Agent, or Firm—Burns, Doane, Swecker & Mathis

[57] ABSTRACT

A transmitter with controlled switches for use in a process for the generation of transmission current signals in an alternating current distribution network is connected to the supply network. When operated, this transmitter generates a series of current impulses. The moments in time of the generation of these current impulses and/or their duration are so chosen that the resulting transmission signal corresponds at least approximately to a desired theoretical signal. The transmitter contains at least two energy storages or energy storage devices and at least two switches for controlling the energy exchange between the two storages. These switches are so controlled that the exchange current flows through the mains, whereby the aforesaid current pulses are generated.

It is thereby possible to use substantially only loss-free elements for the transmitter. The main field of application of the transmitter lies in ripple control technology, where it may be used as a transmitter in a central station (center) or as a transmitter for return signals to the center and for remote reading through the network of distributed meters with return signalling of the state of the meters to a center.

43 Claims, 3 Drawing Sheets

PROCESS AND APPARATUS FOR THE GENERATION OF TRANSMISSION CURRENT SIGNALS IN AN ALTERNATING CURRENT DISTRIBUTION NETWORK

BACKGROUND OF THE INVENTION

This invention relates to a process for the generation of transmission current signals in an alternating current distribution network by means of a transmitter connected to the network and equipped with a controlled switch. In this process, a series of current impulses forming the transmission signal is produced by operation of the switch and the points in time at which these impulses are produced and/or their duration are so chosen that the resulting transmission signal corresponds at least approximately to a desired theoretical signal.

A process of this kind described in European Patent Application No. 85 108 615.7 (Publication Number 0 175 863) corresponding to U.S. Pat. No. 4,642,637, has the advantage that it dispenses with the frequency selective coupling circuits required in other known processes and replaces them by a substantially aperiodic network. This enables the same transmitter to be used for different transmission frequencies and enables redundancy to be introduced into the transmission channel since the signals can be transmitted at different frequencies. The reliability of transmission is thereby considerably enhanced.

The above-mentioned network may in principle be composed either of reactive components or of ohmic components but more detailed analysis shows that, firstly, no choke coil may be directly connected in series with the switch unless the latter is designed for a very high return voltage and, secondly, no capacitor may be directly connected to the switch, i.e., connected to the supply voltage or another capacitor through the switch, unless the switch is designed for very high peak currents which would, however, entail a considerable increase in cost.

If, on this basis, the use of series chokes and parallel capacitors is prohibited, at least in the absence of powerfully damping ohmic components, then such a network has little advantage over a simple resistor. A resistor, however, would have the disadvantage of consuming a considerable supply frequency power. The disadvantage of this lies not so much in the high cost of the energy consumption but rather in the amount of heat which is generated and has to be removed.

SUMMARY OF THE INVENTION

The present invention is provided to improve and modify the process mentioned above so that in the main only loss-free elements can be used for the transmitter. To solve this problem according to the invention, the transmitter for use in the process for the generation of transmission current signals in an alternating current distribution network according to the invention has at least two energy storages or energy storage devices and at least two switches for controlling the exchange of energy between these storages, and the energy storages and the switches are so connected together that the exchange current flows over the network and the aforesaid current pulses are thereby produced.

This invention further relates to a transmitter for carrying out the above-mentioned process, having a control logic which provides the control signals for the above-mentioned switches.

The transmitter according to this invention is desirably characterized by a storage choke and a capacitor circuit connected in series with said choke by said switches and containing the second energy storage.

BRIEF DESCRIPTION OF THE DRAWINGS

The invention will now be described with reference to exemplary embodiments illustrated in the drawings.

DESCRIPTION OF THE PREFERRED EMBODIMENTS

The transmitter illustrated in the figures for use in the process for the generation of transmission current signals according to the invention serves to generate current impulses such that a sequence of these impulses corresponds as closely as possible to a theoretical signal. This may be achieved by suitable choice of the moment in time at which the current impulses are produced and/or of their duration in that the mean value of the signal over time composed of the current impulses (determined over an interval equal to a multiple of the duration of a single impulse) can be made to correspond virtually exactly to the mean value of the desired theoretical signal.

Various exemplary embodiments of the transmitter used for generating the aforesaid current impulses and of its capacitor circuit such as a switched capacitor are described below with reference to the figures.

Figure 1:
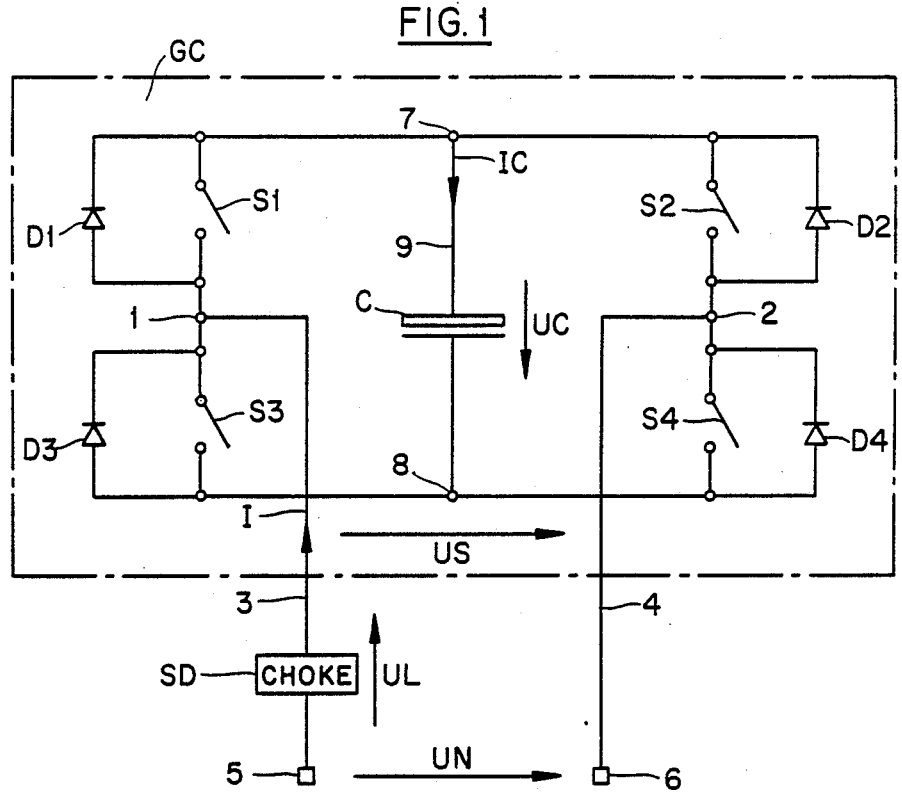
FIG. 1 is a basic circuit diagram of a first exemplary embodiment of a switch-operated capacitor of a transmitter according to the invention.

FIG. 1 is a basic circuit diagram of a first exemplary embodiment of such a capacitor circuit such as switched capacitor GC which is wired up as a bridge circuit composed of four branches. Each of the two nodal points 1 and 2 is connected by a line 3 or 4, respectively, to the supply terminals 5 and 6 between which is the supply voltage UN. Connected into the line 3 is a storage choke SD (choke voltage UL). The two other nodes 7 and 8 of the bridge circuit are connected together by an arm 9 containing a capacitor C. Each of the four arms of the bridge circuit contains a parallel circuit of a controlled switch S1, S2, S3, S4 and a diode D1, D2, D3, D4, respectively. The controlled switches S1 to S4 are preferably one-way current valves which can be switched on and off, such as GTO thyristors or power transistors in bipolar or MOSFET technology while the diodes D1 to D4 are so-called recovery diodes which ensure that at the moment when a switch S1 to S4 is switched off the energy stored in the storage choke SD is added as a positive value to the capacitor voltage UC of the capacitor C so that no excessive recurrent voltage will be applied to the particular switch. A current control valve and its associated recovery diode could conceivably be combined in a single element in the form of a so-called RLT (backwardly conducting thyristor).

Generation of the transmission signal requires a certain capacitor voltage UC. If I(max) is the maximum value of the desired transmission current, f is the transmission frequency and UN(max) is the peak value of the supply voltage, then the required capacitor voltage is given by the formula:

$$UC = UN(max) + 2\pi fLI(max).$$

This capacitor voltage UC may be obtained as follows: With the switches S1 to S4 open (or in other words with the valves closed), the switched capacitor GC constitutes a full wave bridge rectifier which charges the capacitor C to the voltage UN(max). The arrangement illustrated enables the capacitor C to be charged to an even higher voltage by operation of the switches S1 to S4 in such a manner that an effective power of 50 Hz is taken from the supply network. The effective power of 50 Hz is an example of such effective power taken, and the effective power taken would typically correspond to the nominal frequency of the supply voltage. Since the switched capacitor GC contains no elements which on principle are subject to loss, the increasing energy must inevitably result in further charging up of the capacitor C.

If fN is the supply frequency, î is the amplitude of the input current and ûN is the peak value of the supply voltage, then the input current I, the supply voltage UN, the power P and the energy change W(t) in the switched capacitor GC are related as follows:

$I = \hat{i}sin(2\pi fNt)$
$UN = \hat{u}Nsin(2\pi fNt)$
$P = UNI = \hat{u}N\hat{i}(sin(2\pi fNt))^2$
$W(t) = \hat{u}N\hat{i}t/2 - (\hat{u}N\hat{i})sin(4\pi fNt)/8\pi f$ The energy in the capacitor C thus increases monotonously so long as the input current I has a component of the same frequency as the supply frequency and in phase with the supply voltage.

Figure 2:
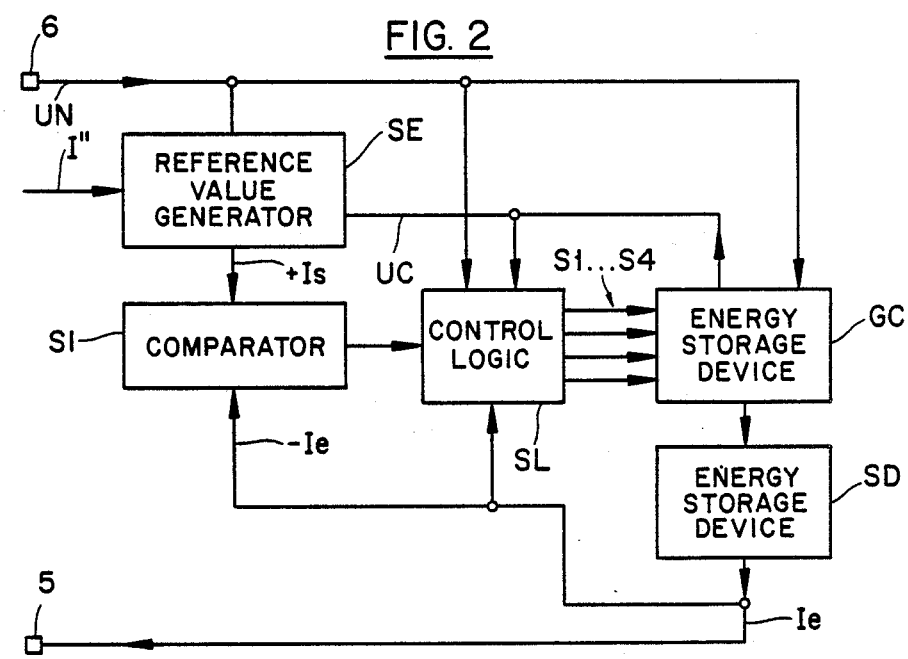
FIG. 2 is a block circuit diagram of a transmitter according to the invention.

FIG. 2 is a block circuit diagram of a transmitter according to the invention which in addition to the capacitor circuit, such as switched capacitor GC, and the storage choke SD contains a stage SE for producing the reference value, a control logic SL and a reference value/actual value comparator SI.

The input 6 is at the supply voltage UN which is supplied to the reference value generator SE, the control logic SL and the switched capacitor GC. The reference value generator SE, which is supplied not only with the supply voltage UN but also with the capacitor voltage UC and other control parameters such as, for example, the signal current I*, generates the required transmission signal Is as analogue signal at the input of the reference/actual value comparator SI at whose other input lies the image of the transmission current Ie. The desired transmission signal Is may be, for example, a pure sine signal. The control logic SL reproduces this reference value by suitable operation of the switches (valves) S1 to S4 of the switched capacitor GC, the difference Is-Ie being as far as possible adjusted to zero by known methods of power electronics such as time discrete two-position or three-position control.

It will now be seen why the capacitor C is required to be at an initial voltage UC. By providing the necessary voltage, it ensures the maximum current change required in the storage choke SD. The latter smooths the input current by integrating the voltage pulses UN-US, where US is the voltage produced by the switched capacitor GC.

The charge of the capacitor C can thus be increased by suitable provision of a 50 Hz reference current (charging current), and a given transmission signal (transmission current) can be reproduced if a sufficient capacitor voltage is provided. These two processes can easily be superimposed to provide for continuous transmission by adding the reference values of the charging current and the transmission current and issuing them as a common reference value. The 50 Hz reference current is an example of such reference current, and the reference current used would typically correspond to the current at the nominal frequency of the supply voltage.

Whether the charge on the capacitor C requires to be increased may be determined, for example, once in each power cycle by tapping the capacitor voltage UC, and the charging current is then supplied or not, depending on the result. If the charge on the capacitor is too high, it may be reduced by reversing the sign of the charging current.

The following Table 1 summarizes the permissible switching conditions of the switches and diodes S1 to S4 and D1 to D4 of the switched capacitor GC (FIG. 1) of the transmitter and the conditions of the input current I, the capacitor current IC, the capacitor voltage UC and the choke voltage UL.

The following signals are used in Table 1:

| 0: Valve/diode blocks | s: Signal value increases |
|---|---|
| 1: Valve/diode conducts | f: Signal value decreases |
| x: Valve does not conduct due to physical conditions, may be switched on | =: Signal value remains constant |
| | g: Greater than zero |
| | k: less than zero |

TABLE 1

| S1 | D1 | S2 | D2 | S3 | D3 | S4 | D4 | I | IC | UC | UL |
|---|---|---|---|---|---|---|---|---|---|---|---|
| 1 | 0 | 0 | 0 | 0 | 0 | 1 | 0 | f k | +I | f | UN − UC |
| x | 1 | 0 | 0 | 0 | 0 | x | 1 | f g | +I | s | UN − UC |
| 0 | 0 | 1 | 0 | 1 | 0 | 0 | 0 | s g | −I | s | UN + UC |
| 0 | 0 | x | 1 | x | 1 | 0 | 0 | s k | −I | f | UN + UC |
| 1 | 0 | x | 1 | 0 | 0 | 0 | 0 | s,f k | ∅ | = | UN |
| x | 1 | 1 | 0 | 0 | 0 | 0 | 0 | s,f g | ∅ | = | UN |
| 0 | 0 | 0 | 0 | 1 | 0 | x | 1 | s,f g | ∅ | = | UN |
| 0 | 0 | 0 | 0 | x | 1 | 1 | 0 | s,f k | ∅ | = | UN |

There are three main equations determining the current and voltage:

| UL = UN + UC | with | IC = −I |
|---|---|---|
| UL = UN − UC | with | IC = +I |
| UL = UN | with | IC = 0 |

The current forms of the two-position or three-position control may be determined from these equations and the equation $dI = (1/L)(UL)dt$.

The magnitude of the components L and C depends on the permissible values of the voltage load on the valves, the wave form of the current, etc. The following, for example, are suitable values: î = 10 A, L = 1 mH, C = 1 mF.

Figure 3:
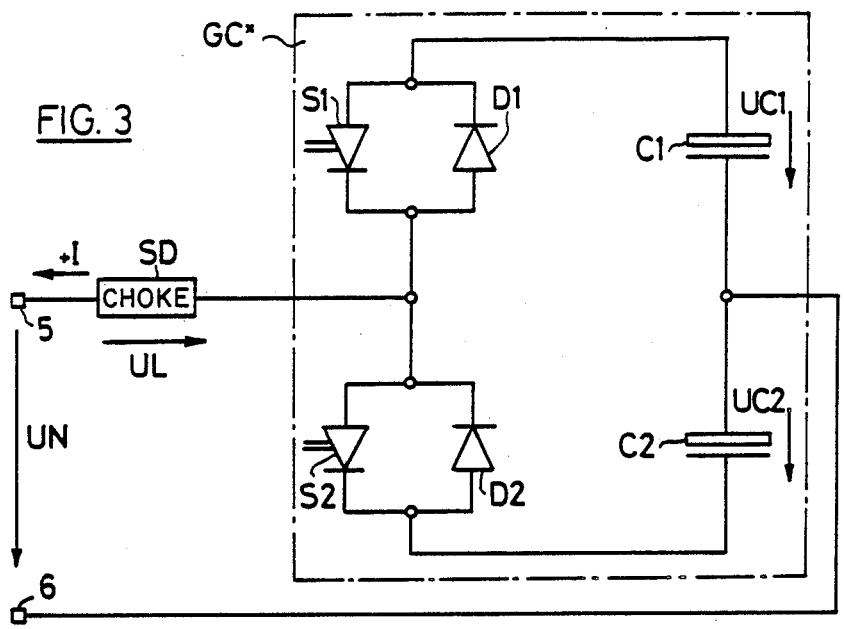
FIG. 3 is a basic circuit diagram of a second exemplary embodiment of a switched capacitor of a transmitter according to the invention.

FIG. 3 shows a capacitor circuit such as switched capacitor GC* consisting of an anti-parallel circuit of two arms each with a controlled switch (valve) S1, S2 and a capacitor C1 or C2 in series. Energy flows between the mains and the two capacitors C1, C2 and conversely as a result of suitable operation of the switches S1 and S2.

Table 2 gives a summary analogous to that of Table 1 showing the choke voltage UL obtained in the various switching positions of the switches S1, S2 in dependence upon the input current I and the supply voltage UN and it shows the capacitor voltages UC1 and UC2. The symbols used correspond to those of Table 1.

| Case | S1 | D1 | S2 | D2 | I | UC1 | UC2 | UL |
|---|---|---|---|---|---|---|---|---|
| a | 1 | 0 | 0 | 0 | g | f | = | UN − UC1 |
| b | X | 1 | 0 | 0 | k | s | = | UN − UC1 |
| c | 0 | 0 | X | 1 | g | = | s | UN + UC2 |
| d | 0 | 0 | 1 | 0 | k | = | f | UN + UC2 |

When the capacitor voltages UC1 and UC2 are greater than UN(max) and UN is greater than zero and S2, for example, is ignited for a duration T1, then the LC oscillatory circuit is triggered and current flows, the value of this current increasing approximately linearly from a value I1 to I2. The current change is expressed by:

$$dI/dt = (UN + UC2)/L.$$

If after a time T1 the valve S2 is closed for a time T2, then the storage choke SD ensures continued circulation of the current, and C2 is discharged and C1 is charged up since D1 is now conductive. The current falls linearly from I2 to I1 but with a different gradient. Trapezoidal current pulses with different energy contents are formed. The change in current is now $dI/dt = (UN − UC1)/L$.

The flow of energy through the power supply between the storage choke SD and the capacitors C1 and C2 and conversely can be controlled by the length of the current impulses, i.e. the length of the time intervals T1 and T2. If cases b and c are preferred, i.e., if longer pulse times are chosen than for a and d, then the voltage across C1 and C2 increases. If the voltage at the capacitors C1 and C2 rises too high, it may be decreased by choosing cases a and d rather than b and c.

It has already been mentioned in the preamble to the description that the possibility of using one and the same transmitter for different transmission frequencies without adjusting it is one of the main advantages of this type of transmitter as it enables redundancy to be used in the transmission channel. The transmission of information in the form of telegrams with basically the same contents but at different frequencies may take place successively or simultaneously.

In the former case, generation of the reference value SE (FIG. 2) is carried out to produce a purer sine signal which may be modulated, for example, in amplitude, frequency or phase. In the second case, i.e, when several telegrams are transmitted simultaneously at different frequencies, reference value generation SE is carried out in such a manner that it generates the sum of the signals of the different telegrams, and the transmitter approximates this reference value by means of a series of current impulses. Since the peak value of the transmission current is in this case higher than in the first case, the elements of the transmitter must be correspondingly larger.

When the transmitter is installed in a low voltage network, the storage choke SD shown in the figures is preferably a coil with iron core and air gap. If the transmitter is installed in a high voltage network or if the switches S1 to S4 are designed for relatively low voltages, the storage choke SD is advantageously replaced by the control inductance of a transformer. In a switched capacitor GC arranged as shown in FIG. 1, the primary coil of this transformer would be placed between the terminals 5 and 6 and the secondary coil between the terminals 1 and 2.

Figure 4:
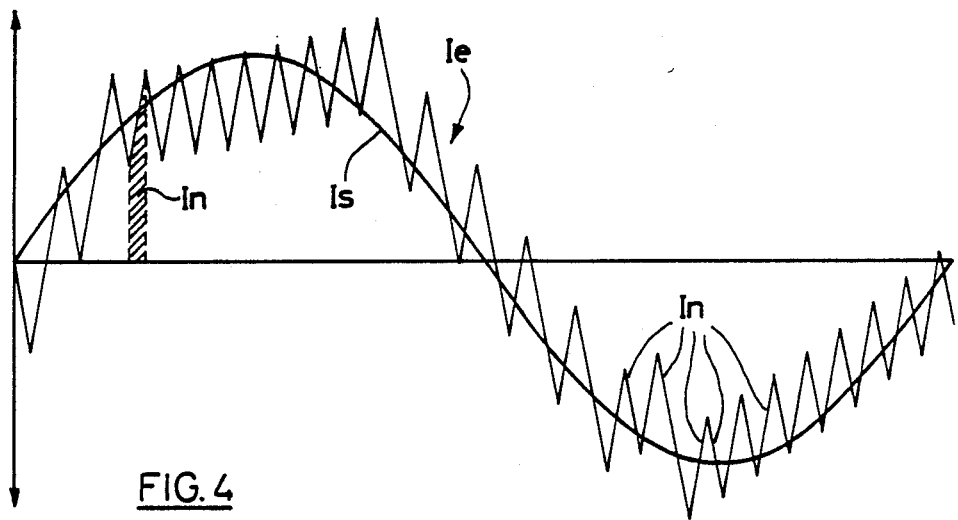
FIG. 4 is an explanatory diagram illustrating the mode of functioning.

FIG. 4 shows by means of a graph how the transmission signal composed of the individual current pulses can be made to correspond with the desired theoretical signal.

In the example illustrated, the desired transmission signal Is is sinusoidal and the transmission current Ie is composed of the individual current pulses In, a single current pulse corresponding to the shaded area. The desired transmission signal is tapped periodically to determine on each occasion whether the actual value of the current pulse In obtained is greater or smaller than the corresponding discrete value of Is. The next following current pulse is then selected on the basis of this comparison and according to whether the current pulse In is rising or falling, and the switches S1 to S4 or S1, S2 are operated accordingly, as shown in Tables 1 and 2.

In order that the transmission signal Ie composed of the current pulses In may be approximated more closely to the desired theoretical signal Is, it may be advantageous in certain cases to reduce both the current increase dI/dt and at the same time the voltage US across the switched capacitor GC. This may be achieved if from time to time only the supply voltage UN is applied to this circuit.

In such cases, a short circuit is sufficient for obtaining the necessary steepness of gradient of the current change in the storage choke SD. In the switched capacitor GC of FIG. 1, this may be achieved by simultaneously igniting the switches S1 and S2 or S3 and S4, in which cases a short circuit occurs through the storage choke SD. If this short circuit is interrupted, then the energy stored in the choke SD flows through the recovery diodes D1 to D4 into the capacitor C or the capacitors C1, C2.

Figure 5:
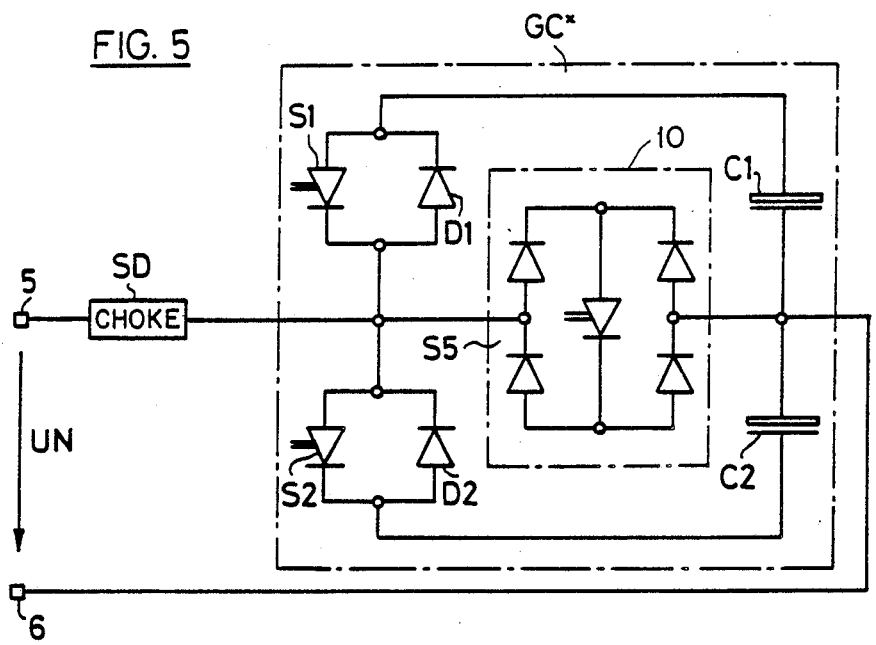
FIG. 5 is a basic circuit diagram of a variation of FIG. 3.

With the mid-point connection shown in FIG. 3, such a short circuit is not easily realized but requires a third arm 10 with two-way switch (two-way valve) S5 capable of being switched on and off (two-way valve) between the two anti-parallel arms, as shown in FIG. 5.

Figure 6:
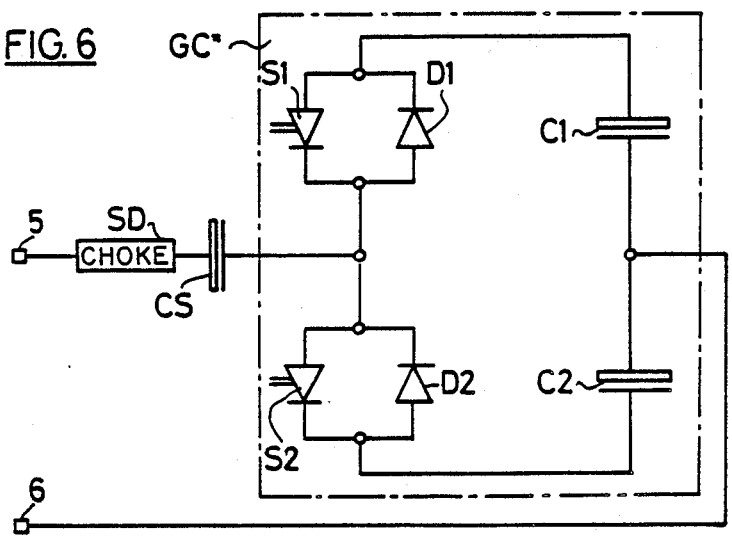
FIG. 6 is a basic circuit diagram of another variation of FIG. 3.

FIG. 6 shows a variation of the switched capacitor GC* of FIG. 3, in which a capacitor CS is connected between the storage choke SD and the switches S1, S2. This modification, which incidentally may, of course, also be used with the switched capacitor GC of FIG. 1, enables a reduction in the switching voltage to be achieved in that with suitable operation of the switches S1, S2 it enables a 50 Hz reactive current to be consumed, which causes a voltage drop across the capacitor CS so that only a reduced voltage is obtained at the switches. The voltage across the capacitors C1 and C2 can be controlled by establishing a suitable 50 Hz active current component.

The voltage across the switches S1, S2 is composed of the capacitor voltages UC1, UC2, the supply voltage UN and the 50 Hz voltage drop across the storage choke SD and the capacitor CS connected in series. If the moments of activation and inactivation of the switches S1, S2 are so adjusted that a 50 Hz reactive current circulates, the result is that on average no change takes place in the capacitor voltages UC1 and UC2, as may be seen from Table 2. This 50 Hz reactive current produces a 50 Hz voltage drop in the series LC circuit of storage choke SD and capacitor CS so that only a small residue of the 50 Hz voltage of the power supply is obtained at the switches S1, S2. The 50 Hz reactive current is an example of such current, and the reactive current used would typically correspond to the current at the nominal frequency of the supply voltage.

By means of the additional capacitor CS connected in series with the storage choke SD, the switched capacitor GC or GC* of FIG. 1 or FIG. 3, respectively, may be operated with switches S1 to S4 or S1, S2, which need not be of the size that would be required for carrying the full voltage UC or UC1+UC2 which are equal or higher than the maximum value of UN or 2UN respectively without this capacitor. This may be particularly advantageous for transmitters connected to a medium high voltage although precautions must then be taken to ensure that transient occurrences will not destroy the switches.

A transmitter according to the invention or of the type described in EP publication No. 0 175 863, corresponding to U.S. Pat. No. 4,642,637, cited above, is useful in particular for acknowledging or reporting back the counter reading from electricity meters, or information about executed commands from ripple control receivers to a central station (centre). Transmitters of the type described in Swiss Patent Application No. 03 923/86-0 are used as ripple control transmitters for the transmission of ripple control telegrams from the centre to the ripple control receivers distributed over the network A transmitter described above according to the invention may be used as described for the transmission of information from outlying ripple control receivers to the centre but, however, it also opens up the interesting possibility of its use as ripple control transmitter for the transmission of information from the centre to outlying receivers. This would have the advantage over known ripple control transmitters that the control frequency would be substantially independent and no direct current would be required. However, such an arrangement would require considerably larger valves than those used for static frequency convertors with a direct current intermediate circuit because the product of peak current times return voltage would be larger.

In such an application as ripple control transmitter, the storage choke SD could advantageously be formed by the short circuit impedance (=leakage impedance) of a conventional medium voltage/low voltage transformer (for example, 20/0.4 kV). The transmitter should have a three-phase construction, i.e., as three single-phase constructions.

It will be appreciated by those of ordinary skill in the art that the present invention can be embodied in other specific forms without departing from the spirit or essential characteristics thereof. The presently disclosed embodiments are therefore considered in all respects to be illustrative and no restrictive. The scope of the invention is indicated by the appended claims rather than the foregoing description, and all changes that come within the meaning and range of equivalents thereof are intended to be embraced therein.

I claim:

1. A method for the generation of transmission current signals in an alternating current distribution network comprising the steps of:

generating an exchange current by means of a transmitter connected to said network, said transmitter including a non-resonant circuit, said non-resonant circuit having at least two energy storage devices to provide for a mutual exchange of energy between said energy storage devices, and said transmitter including at least two switches to control the exchange of energy between said energy storage devices, and operating said switches to control the flow of said exchange current over said network to thereby produce a series of current impulses forming the transmission signal such that the resulting transmission signal corresponds at least approximately to a desired theoretical signal.

2. The method according to claim 1 wherein said current impulses are created at predetermined points in time.

3. The method according to claim 1 wherein said current impulses are of predetermined duration.

4. The method according to claim 3 wherein said current impulses are created at predetermined points in time.

5. The method according to claim 1 wherein one of said energy storage devices is formed by storage choke and another of said energy storage devices is formed by at least one capacitor connected in series with said storage choke, and wherein the exchange of energy between said storage choke and said another energy storage device formed by at least one capacitor though said network is controlled by the points in time at which said switches are switched on and off and thereby controlling the amplitude and duration of said resulting current impulses.

6. The method according to claim 5 further comprising the step of:

adding one of a positive and negative active current at the nominal frequency of the supply voltage to the desired signal current through control of said switches so that the voltage across said at least one capacitor is kept close to a reference value.

7. The method according to claim 5 wherein in said transmitter a series capacitor is connected in series with said storage choke to enable a reduction in the switching voltage for said switches.

8. The method according to claim 7 further comprising the step of:

adding a reactive current at the nominal frequency of the supply voltage to the desired signal current through control of said switches to create a corresponding voltage drop along said series capacitor in that said switches may be designed for a lower return voltage than that corresponding to the supply voltage to said transmitter.

9. The method according to claim 8 further comprising the step of:

providing a short circuit by way of said storage choke so that only the supply voltage of said transmitter is used for producing said current impulses when the current impulse curve is too steep.

10. The method according to claim 1 wherein transmission signals of different frequencies are transmitted simultaneously in said alternating current distribution network.

11. The method according to claim 10 further comprising the step of:

generating by said transmitter an approximate sum of said transmission signals of different frequencies by means of a series of said current impulses.

12. A method for the generation of transmission current signals in an alternating current distribution network comprising the steps of:
generating an exchange current by means of a transmitter connected to said network, said transmitter having at least two energy storage devices to provide for a mutual exchange of energy between said energy storage devices and said transmitter having at least two switches to control the exchange of energy between said energy storage devices, and
operating said switches to control the flow of said exchange current over said network to thereby produce a series of current impulses forming the transmission signal such that the resulting transmission signal corresponds at least approximately to a desired theoretical signal, wherein said resulting transmission signal is formed by a series of several said current impulses directly following one another.

13. The method according to claim 12, wherein said current impulses have at least one of an approximately trapezoidal or triangular form so that said resulting transmission signal has a sawtooth contour.

14. The method according to claim 13 wherein one of said energy storage devices is formed by a storage choke and another of said energy storage devices is formed by at least one capacitor connected in series with said storage choke, and
wherein the exchange of energy between said storage choke and said another energy storage device formed by at least one capacitor through said network is controlled by the points in time at which said switches are switched on and off and thereby controlling the amplitude and duration of said resulting current impulses.

15. The method according to claim 14 further comprising the step of:
adding one of a positive and negative active current at the nominal frequency of the supply voltage to the desired signal current through control of said switches so that the voltage across said at least one capacitor is kept close to a reference value.

16. The method according to claim 14 wherein in said transmitter a series capacitor is connected in series with said storage choke to enable a reduction in the switching voltage for said switches.

17. The method according to claim 16 further comprising the step of:
adding a reactive current at the nominal frequency of the supply voltage to the desired signal current through control of said switches to create a corresponding voltage drop along said series capacitor in that said switches may be designed for a lower return voltage than that corresponding to the supply voltage to said transmitter.

18. The method according to claim 17 further comprising the step of:
providing a short circuit by way of said storage choke so that only the supply voltage of said transmitter is used for producing said current impulses when the current impulse curve is too steep.

19. The method according to claim 12 wherein one of said energy storage devices is formed by a storage choke and another of said energy storage devices is formed by at least one capacitor connected in series with said storage choke, and
wherein the exchange of energy between said storage choke and said another energy storage device formed by at least one capacitor through said network is controlled by the points in time at which said switches are switched on and off and thereby controlling the amplitude and duration of said resulting current impulses.

20. The method according to claim 19 further comprising the step of:
adding one of a positive and negative active current at the nominal frequency of the supply voltage to the desired signal current through control of said switches so that the voltage across said at least one capacitor is kept close to a reference value.

21. The method according to claim 19 wherein in said transmitter a series capacitor is connected in series with said storage choke to enable a reduction in the switching voltage for said switches.

22. The method according to claim 21 further comprising the step of:
adding a reactive current at the nominal frequency of the supply voltage to the desired signal current through control of said switches to create a corresponding voltage drop along said series capacitor in that said switches may be designed for a lower return voltage than that corresponding to the supply voltage to said transmitter.

23. The method according to claim 22 further comprising the step of:
providing a short circuit by way of said storage choke so that only the supply voltage of said transmitter is used for producing said current impulses when the current impulse curve is too steep.

24. A transmitter for use in the generation of transmission current signals in an alternating current distribution network comprising:
A non-resonant circuit having at least two energy storage devices wherein a first of said energy storage devices is a storage choke and a capacitor circuit contains a second of said energy storage devices and is arranged in series with said storage choke, said energy storage devices being provided for a mutual exchange of energy,
at least two switches to control the exchange of energy between said energy storage devices and create the flow of an exchange current over said alternating current distribution network to create a series of current impulses forming the transmission signal such that the resulting transmission signal corresponds at least approximately to a desired theoretical signal, and
a control logic for supplying control signals to said switches to control said exchange of energy between said energy storage devices.

25. The transmitter according to claim 24 wherein said current impulses are created at predetermined points in time.

26. The transmitter according to claim 24 wherein said current impulses are of predetermined duration.

27. The transmitter according to claim 26 wherein said current impulses are created at predetermined points in time.

28. The transmitter according to claim 24 wherein said storage choke is formed by the control impedance of a transformer.

29. The transmitter according to claim 28 wherein said capacitor circuit is a switched capacitor including a bridge circuit having said controlled switches operably connected in the arms of the bridge circuit and having a storage capacitor operably connected in the bridge circuit.

30. The transmitter according to claim 29 wherein said controlled switches are formed by one-way current valves which can be switched on and off.

31. The transmitter according to claim 29 further comprising a series capacitor connected in series with said storage choke to enable a reduction in the switching voltage for said switches.

32. The transmitter according to claim 28 wherein said capacitor circuit is a switched capacitor formed by an anti-parallel circuit having two arms, each arm having a controlled switch and a capacitor connected in series.

33. The transmitter according to claim 32 wherein said controlled switches are formed by one-way current valves which can be switched on and off.

34. The transmitter according to claim 32 further comprising a series capacitor connected in series with said storage choke to enable a reduction in the switching voltage for said switches.

35. The transmitter according to claim 32 wherein said switched capacitor has a third arm having a two-way valve capable of being switched on and off with said third arm being provided between said two anti-parallel arms.

36. The transmitter according to claim 28 wherein said transmitter has a three-phase construction for use as a ripple control transmitter in a central station.

37. The transmitter according to claim 24 wherein said capacitor circuit is a switched capacitor formed by an anti-parallel circuit having two arms, each arm having a controlled switch and a capacitor connected in series.

38. The transmitter according to claim 37 wherein said controlled switches are formed by one-way current valves which can be switched on and off.

39. The transmitter according to claim 37 further comprising a series capacitor connected in series with said storage choke to enable a reduction in the switching voltage for said switches.

40. The transmitter according to claim 37 wherein said switched capacitor has a third arm having a two-way valve capable of being switched on and off with said third arm being provided between said two anti-parallel arms.

41. A transmitter for use in the generation of transmission current signals in an alternating current distribution network comprising:
   at least two energy storage devices wherein a first of said energy storage devices is a storage choke and a capacitor circuit contains a second of said energy storage devices and is arranged in series with said storage choke, said energy storage devices being provided for a mutual exchange of energy,
   at least two switches to control the exchange of energy between said energy storage devices and create the flow of an exchange current over said alternating current distribution network to create a series of current impulses forming the transmission signal such that the resulting transmission signal corresponds at least approximately to a desired theoretical signal, and
   a control logic for supplying control signals to said switches to control said exchange of energy between said energy storage devices,
   wherein said capacitor circuit is a switched capacitor including a bridge circuit having said controlled switches operably connected in the arms of the bridge circuit and having a storage capacitor operably connected in the bridge circuit.

42. The transmitter according to claim 41 wherein said controlled switches are formed by one-way current valves which can be switched on and off.

43. The transmitter according to claim 41 further comprising a series capacitor connected in series with said storage choke to enable a reduction in the switching voltage for said switches.

* * * * *